United States Patent
Bernhardt et al.

(10) Patent No.: US 12,529,575 B2
(45) Date of Patent: Jan. 20, 2026

(54) SYSTEM AND METHOD FOR DETECTING ACTIVE ROAD WORK ZONES

(71) Applicant: HERE Global B.V., Eindhoven (NL)

(72) Inventors: Bruce Bernhardt, Wauconda, IL (US); Jingwei Xu, Buffalo Grove, IL (US); Leon Stenneth, Chicago, IL (US); Advait Mohan Raut, Virar West (IN); Weimin Huang, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 221 days.

(21) Appl. No.: 18/085,176

(22) Filed: Dec. 20, 2022

(65) Prior Publication Data

US 2024/0200975 A1    Jun. 20, 2024

(51) Int. Cl.
G01C 21/00    (2006.01)
G01C 21/36    (2006.01)

(52) U.S. Cl.
CPC ..... *G01C 21/3822* (2020.08); *G01C 21/3691* (2013.01); *G01C 21/3841* (2020.08)

(58) Field of Classification Search
CPC ............ G01C 21/3822; G01C 21/3691; G01C 21/3841
See application file for complete search history.

(56) References Cited

U.S. PATENT DOCUMENTS

| | | | |
|---|---|---|---|
| 9,221,461 B2 | 12/2015 | Ferguson et al. | |
| 10,282,999 B2 | 5/2019 | Creusot | |
| 10,317,906 B2 | 6/2019 | Ferguson et al. | |
| 2016/0046290 A1* | 2/2016 | Aharony | B60W 10/20 |
| | | | 701/41 |
| 2019/0362159 A1 | 11/2019 | Cooley | |
| 2020/0004239 A1 | 1/2020 | Pedersen et al. | |
| 2020/0050901 A1* | 2/2020 | Kirchner | G06V 10/7788 |
| 2020/0292330 A1* | 9/2020 | Rabel | G01C 21/3867 |
| 2021/0383687 A1* | 12/2021 | Stenneth | G08G 1/0116 |
| 2021/0393687 A1* | 12/2021 | Spencer | A61K 40/31 |
| 2022/0185313 A1* | 6/2022 | Wang | B60W 40/06 |

OTHER PUBLICATIONS

Merriam-Webster, "algorithm," 2013. (Year: 2013).*

* cited by examiner

*Primary Examiner* — Aniss Chad
*Assistant Examiner* — Stephanie T Su
(74) *Attorney, Agent, or Firm* — DITTHAVONG, STEINER & MLOTKOWSKI

(57) ABSTRACT

The disclosure provides a system, a method, and a computer program product for detecting active road work zones. The system obtains first sensor data associated with a detection of a road work zone, using a first sensor type and obtains second sensor data associated with presence of at least one individual in the road work zone, using a second sensor type. Further, the system determines a confidence level associated with the detection of the road work zone based on fusing of the first sensor data and the second sensor data. The system classifies the detected road work zone as at least one of the active road work zone or a non-active road work zone, based on the confidence level. The system updates map data associated with a map of a region based on the classification.

20 Claims, 10 Drawing Sheets

```
{
  "timestamp": 1454341279615

"type": "BMW: RAW_STA3_LEARNING_VRU",

"extensions": {
    "reporter": "sta3-learning-1.0.0-2016-07-07.08:17-1146b7e",
    "jobId": "TheJobIdProvidedByTheJobServer",
    "simulation": "true"
  },
  "data": {
    "VRU": [{"number": 3, "timestamp": 1454341279615, "xDistances":
    3034.23,2014.34,1342.23, "yDistances": 512.35,46.32,76.34}],
    "sensor": {
      "laneBoundaryTypes": [2, 0, 0, 0],
      "envlearning": {
        "version": "1.0.1",
        "qualyfier": 0,
        "dataBuffer": "AQPoEQD/AQB7BAEACREA/wEAewQBAD
        wRAP8BAHwDAQRVEQD/AQB7BQEA1REA/wEAegQBAM
        gRAAAAADwEAQSSEQD/AQB6BAEBBBEA/wEAeglBATU
        RANgCAAAAAQFdEQDYAQB7AQEFeBEA2QMAewMBBY
        ERANgDAHaDAQW0EQDYAgB7AwEF5REAAAAAfAMBBg0
        RAAAAAHwDAQY/AQD/AQB6AwEGSREA/wEAegMBBnsB
        AP8BAHsBAQLFAQD/AQB6AQEG1QEA/wEAegMBBwcBA
        FMCAHsEAQMpAQBUBAB6AgEHQwEA/wMAeQlBB3oBAP8
        ADwCAQ01AQAAAAB6Aw=="
      }
    },
    "config": {
      "laneBoundaryTypesPhyDiv": [2, 4, 6, 8, 9, 11],
      "macDistancePhysDiv": 4,
      "minNumberOfPointsPhysDiv": 2,
      "maxQuantile25TolerancePhysDiv": 1.5,
      "maxQuantile50TolerancePhysDiv": 0.5,
      "maxQuantile75TolerancePhysDiv": 1.5,
      "packagewindowPhysDiv": 75,
      "minPercentagePhysDiv": 66,
      "oncTr-f0ffDist": 400,
      "vruOffDist": 400,
      "verboseProbe": false,
      "jobId": "TheJobIdProvidedByTheJobServer",
      :probeLane": "BATCH"
```

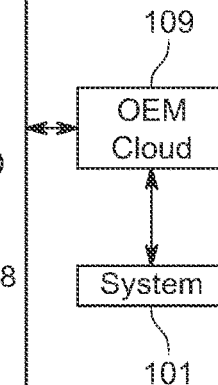

FIG. 4

| Roadworks id | Time epoch | Mon | Tue | Wed | ..... | Sun |
|---|---|---|---|---|---|---|
| RW123 | 9 to 12 | Active | Active | Active | | Not Active |
| RW123 | 12 to 3 | Active | No data | Active | | No data |
| RW123 | ..... | Active | Active | Not Active | | Active |

FIG. 5

SYSTEM AND METHOD FOR DETECTING ACTIVE ROAD WORK ZONES

TECHNOLOGICAL FIELD

The present disclosure generally relates to vehicle navigation systems, and more particularly relates to system and method for detecting road work zones for vehicle navigation systems.

BACKGROUND

An autonomous vehicle is a vehicle that is capable of sensing its environment and navigating with little or no user input. The autonomous vehicle may be associated with a road work observation (RWO) system that uses sensor data obtained from sensing devices such as radar, LiDAR, and image sensors. In addition, the RWO system utilizes front facing cameras installed in the autonomous vehicle to detect active road works or active road work zones by capturing visual indicators such as cones and barrels, and bollards. But still problems exist with accurate detection of such road work zones and objects associated with them, leading to an increased risk of navigation.

Accordingly, it is desirable to provide systems and methods that are capable of detecting the presence of active road work zones accurately along a route. Furthermore, other desirable features and characteristics of the present invention will become apparent from the subsequent detailed description and the appended claims, taken in conjunction with the accompanying drawings and the foregoing technical field and background.

SUMMARY

As discussed, current RWO systems face challenges in accurate detection of road work zones. Specifically, current RWO systems do not accurately distinguish between construction workers and regular pedestrians. Thus, the RWO system may generate false positive active road work zones. These false positives may cause an inconvenience for a driver of the autonomous vehicle as well as the navigation system, which then may determine an alternate route to the destination or may switch driving mode of the autonomous vehicle from automatic to manual even without a genuine need.

Accordingly, in order to provide accurate, safe, and reliable driving assistance applications and autonomy of vehicles, it is important to detect active road works on one or more roads in real time. Further, even more safe, and user-oriented driving assistance services can be provided to the end users. To this end, the data utilized for providing road work observations, should consider accurate and up-to-date instructions for passage of vehicle through the one or more roads. Especially, in the context of driving assistance for autonomous vehicles and semi-autonomous vehicles, it is important that the assistance provided is real-time, up-to-date, safe, and accurate. There is a need of a system that may provide real time road work observations and alert users of the vehicles based on the real time road work observations. Example embodiments of the present disclosure provide a system, a method, and a computer program product for detecting the active road work zones and providing road works observation in order to overcome the challenges discussed above.

A system, a method and a computer programmable product are provided for implementing a process of detecting active road work zones.

In one aspect, a system for detecting the active road work zones is disclosed. The system comprises a memory configured to store computer-executable instructions; and at least one processor configured to execute the computer-executable instructions to obtain, first sensor data associated with a detection of a road work zone using a first sensor type. The at least one processor is further configured to obtain second sensor data associated with presence of at least one individual in the road work zone, using a second sensor type. The at least one processor is further configured to determine a confidence level associated with the detection of the road work zone based on fusing of the data obtained from the first sensor type and the second sensor type. In addition, the at least one processor is configured to classify the detected road work zone as at least one of the active road work zone or a non-active road work zone, based on the confidence level. The at least one processor is configured to update map data associated with a map of a region based on the classification.

In additional system embodiments, the first sensor data and the second sensor data are obtained from a plurality of sensors comprised of the first sensor type and the second sensor type installed in one or more vehicles, wherein the first sensor type comprises a first camera and the second sensor type comprises a second camera.

In additional system embodiments, the first sensor data comprises data associated with at least one of distance between the one or more vehicles and objects on one or more roads, geographical location of the one or more roads, images of road objects, 3-dimensional surrounding images of the one or more vehicles, and construction related signs on the one or more roads.

In additional system embodiments, fusion of the first sensor data obtained from the first sensor type and the second sensor data obtained from the second sensor type includes determining a first region associated with the detection of the road work zone using the first sensor data of the first sensor type; extracting the second sensor data of the second sensor type for the determined first region; and fusing the first sensor data of the first sensor type and the extracted second sensor data of the second sensor type based on a spatio-temporal constraint criterion.

In additional system embodiments, the spatio-temporal constraint criterion comprises determining a first road link, a first travel direction, and a first timestamp associated with the first sensor data of the first sensor type; determining a second road link, a second travel direction, and a second timestamp associated with the second sensor data of the second sensor type; and fusing the first sensor data of the first sensor type and the extracted second sensor data of the second sensor type when the first road link, the first travel direction, and the first timestamp associated with the first sensor data of the first sensor type overlap respectively with the second road link, the second travel direction, and the second timestamp associated with the second sensor data of the second sensor type.

In additional system embodiments, the second sensor data associated with the presence of the at least one individual in the road work zone using the second sensor type comprises vulnerable road user (VRU) data associated with the second sensor type. The VRU data further comprises at least: a number value, a timestamp value, a lateral distance value and a longitudinal distance value.

In additional system embodiments, the confidence level increases when the presence of vulnerable road user (VRU) is determined in the detected road work zone.

In additional system embodiments, the at least one processor is configured to apply a machine learning algorithm on the obtained first sensor data and the second sensor data associated with the detected road work zone.

In additional system embodiments, the at least one processor is configured to calculate longitudinal and lateral distances between a vulnerable road user and the one or more vehicles.

In additional system embodiments, the at least one processor is configured to provide to send alerts associated with the active road work zone to the one or more vehicles, based on the determined confidence level.

In additional system embodiments, the at least one processor is configured to aggregate a number of observations of the active road work zone to determine the confidence level. The confidence level associated with the active road works increases as the number of observations of the active road work zone increases. Further, the at least one processor is configured to create pattern data for long term active road works based on the number of observations of the active road work zone.

In additional system embodiments, the detected road work zone is classified as the active road work zone when the confidence level is above a predefined threshold; or the non-active road work zone when the confidence level is below the predefined threshold.

In another aspect, a method for detecting active road work zone is provided. The method comprises obtaining first sensor data associated with a detection of a road work zone, using a first sensor type. The method comprises obtaining second sensor data associated with presence of at least one individual in the road work zone, using a second sensor type. The method further comprises determining a confidence level associated with the detection of the road work zone based on fusing of the first sensor data obtained from the first sensor type and the second sensor data obtained from the second sensor type. In addition, the method comprises classifying the detected road work zone as at least one of the active road work zone or a non-active road work zone, based on the confidence level. The method further comprises updating map data associated with a map of a region based on the classification.

In yet another aspect, a computer program product comprising a non-transitory computer readable medium having stored thereon computer executable instructions which when executed by at least one processor, cause the processor to conduct operations for detecting the active road work zone. The operations comprise obtaining first sensor data associated with a detection of a road work zone, using a first sensor type. The operations comprise obtaining second sensor data associated with presence of the at least one individual in the road work zone, using a second sensor type. The operation further comprises determining a confidence level associated with the detection of the road work zone based on fusing of the first sensor data obtained from the first sensor type and the second sensor data obtained from the second sensor type. In addition, the operation comprises classifying the detected road work zone as at least one of the active road work zone or a non-active road work zone, based on the confidence level. The operation further comprises updating map data associated with a map of a region based on the classification.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1A:
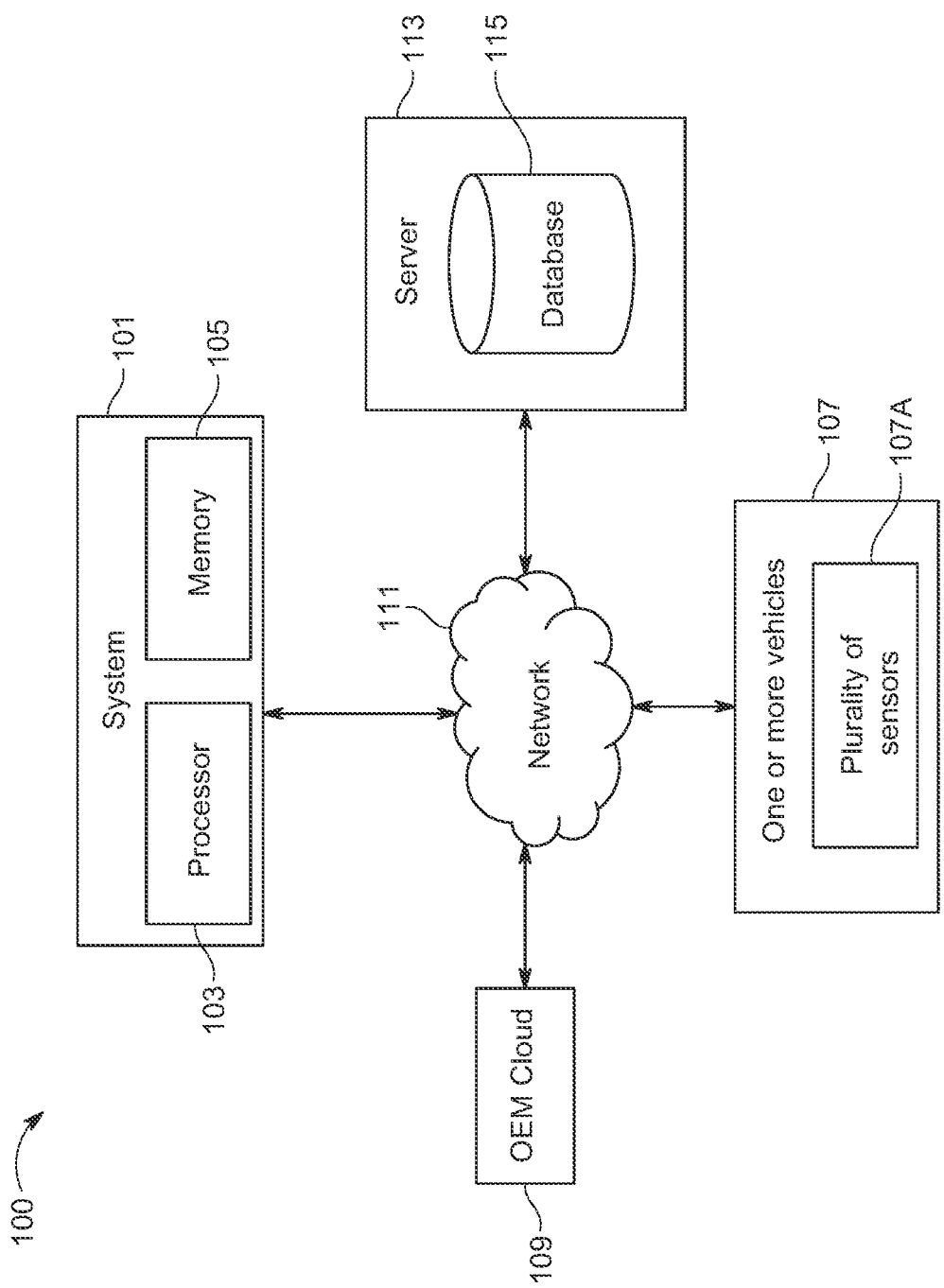
Figure 1B:
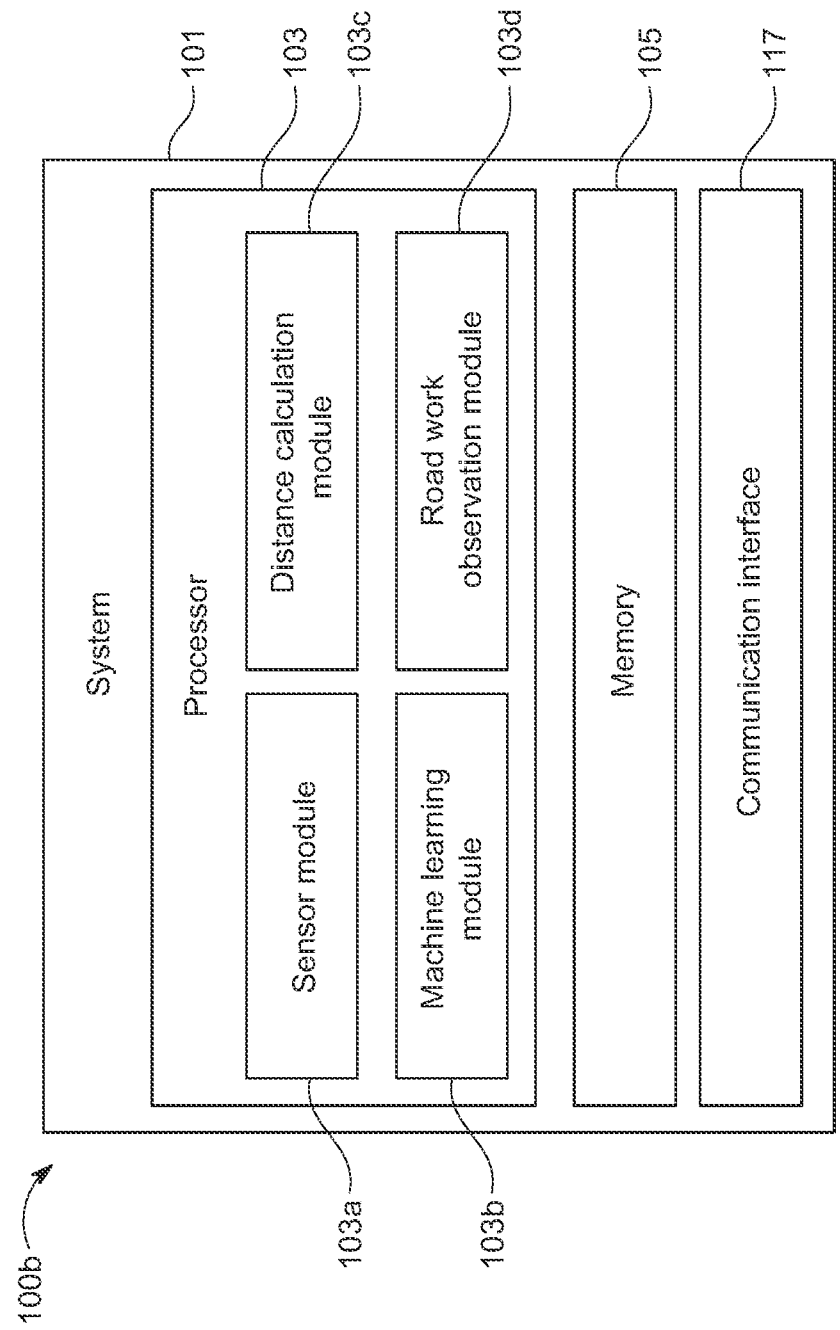
Figure 1C:
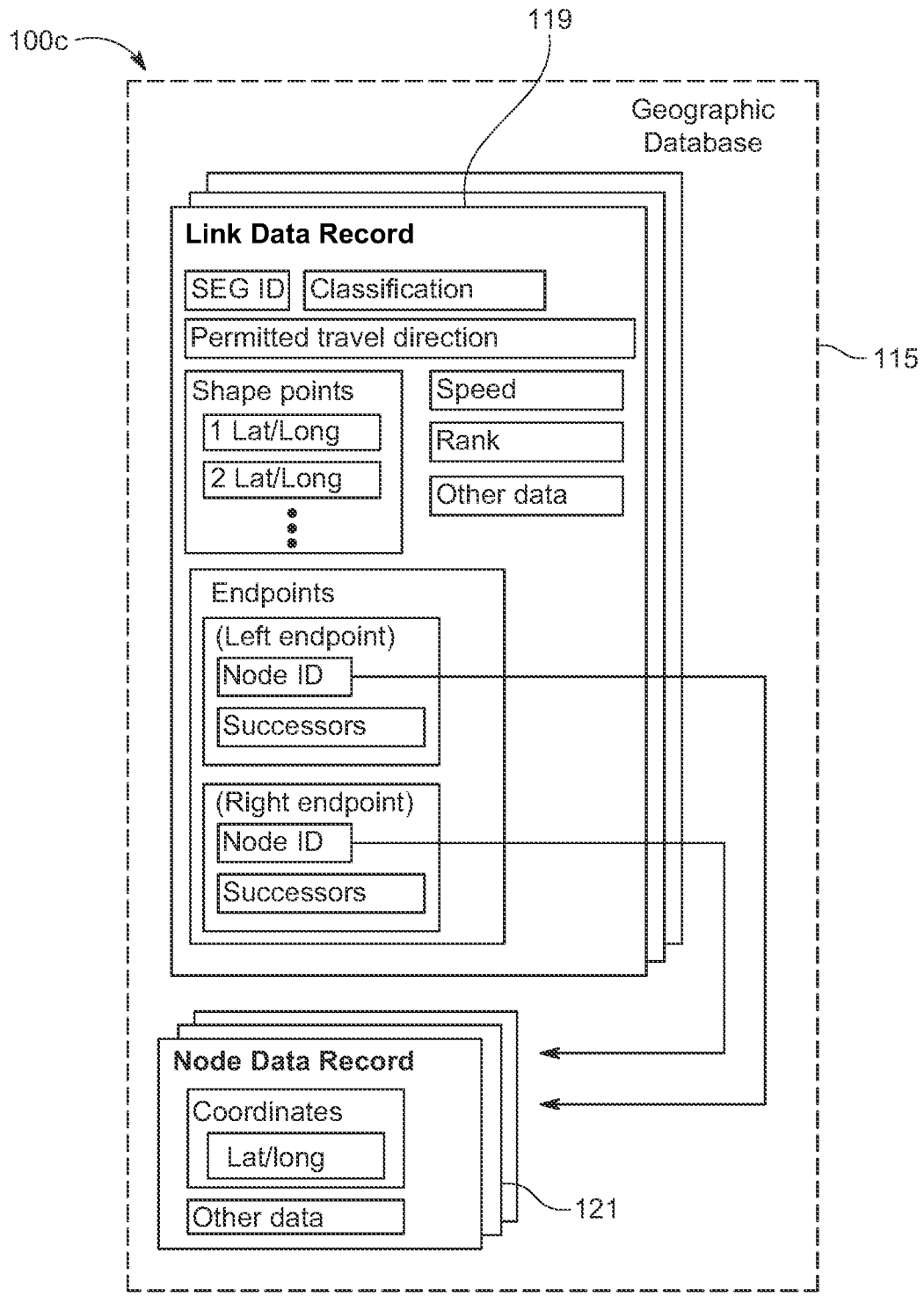
Figure 1D:
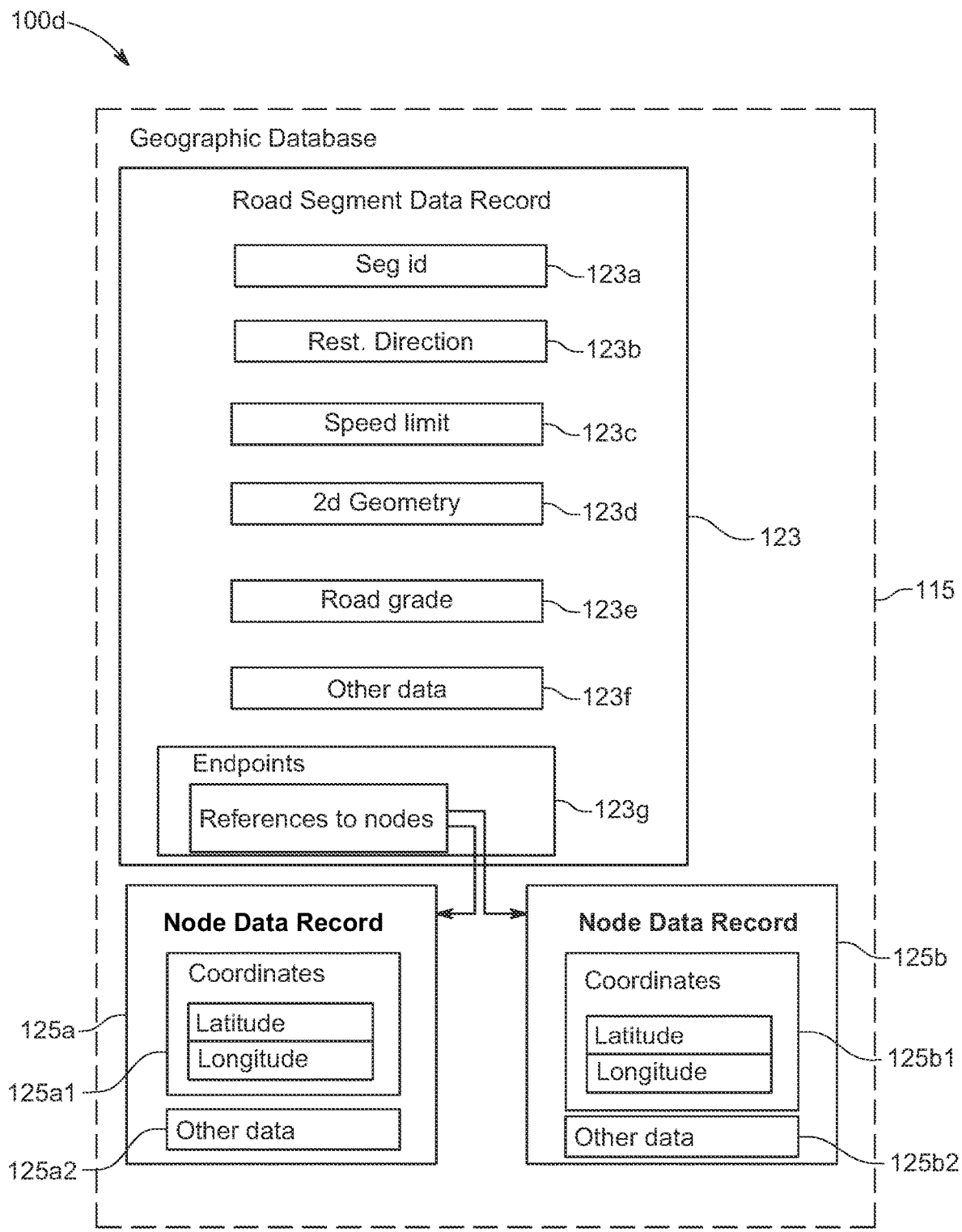
Figure 1E:
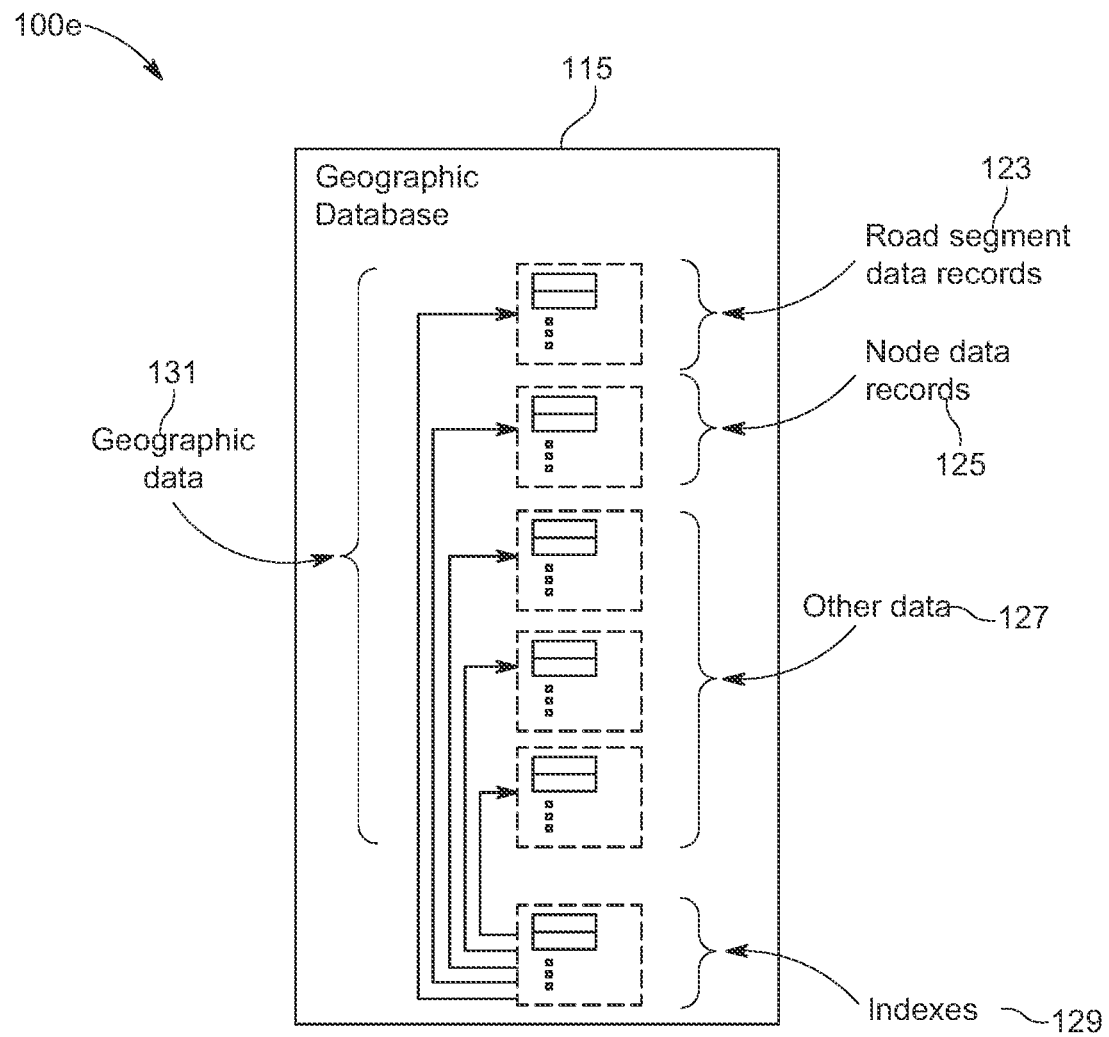
Figure 2:
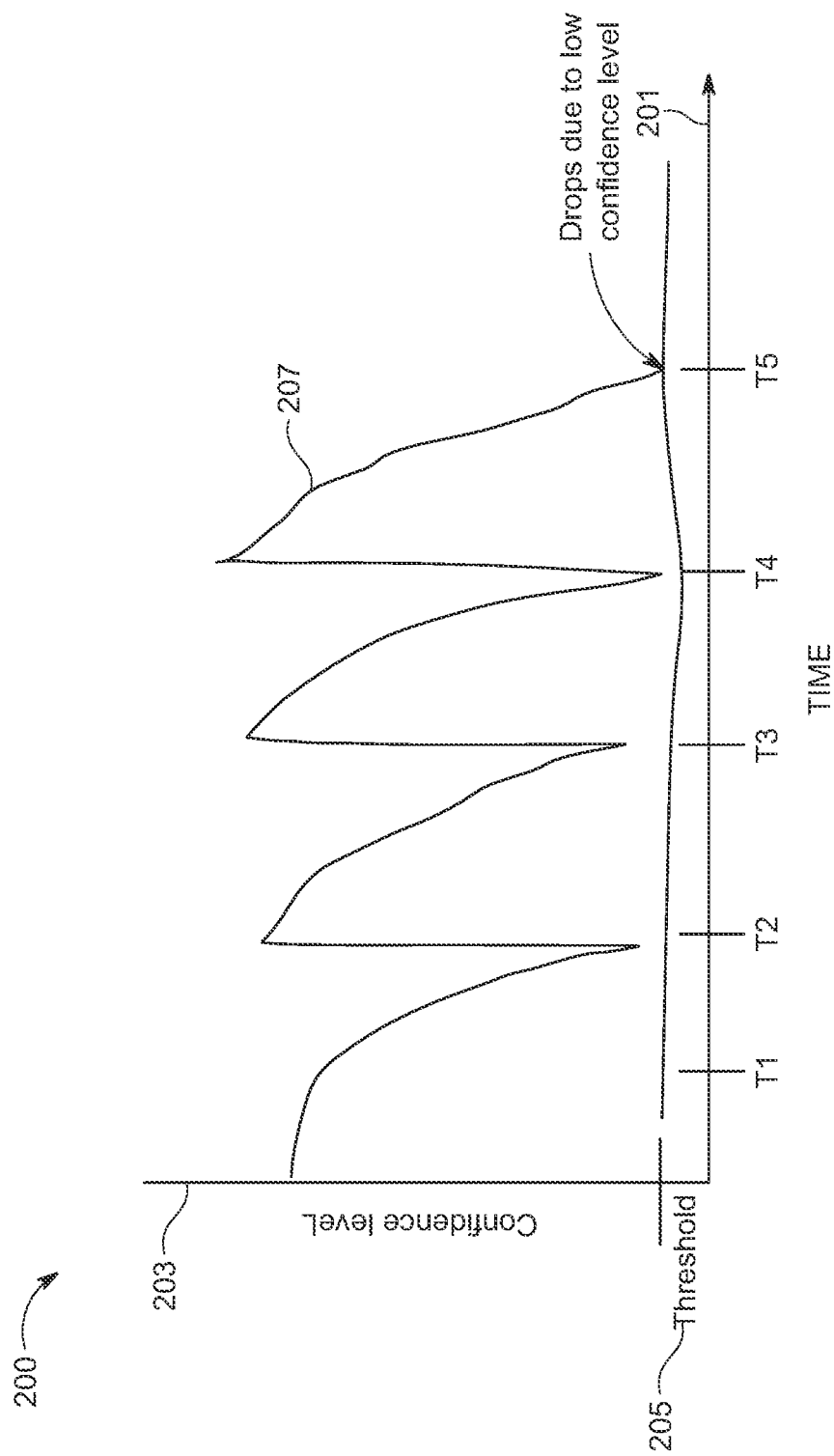
Figure 3:
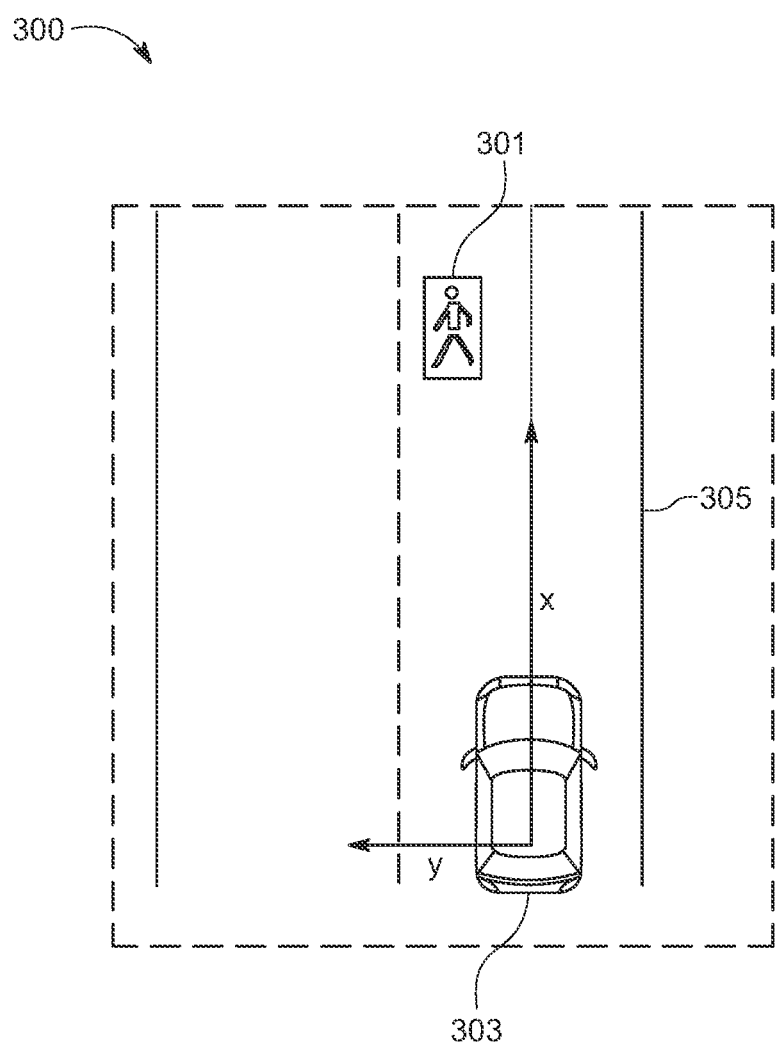
Figure 6:
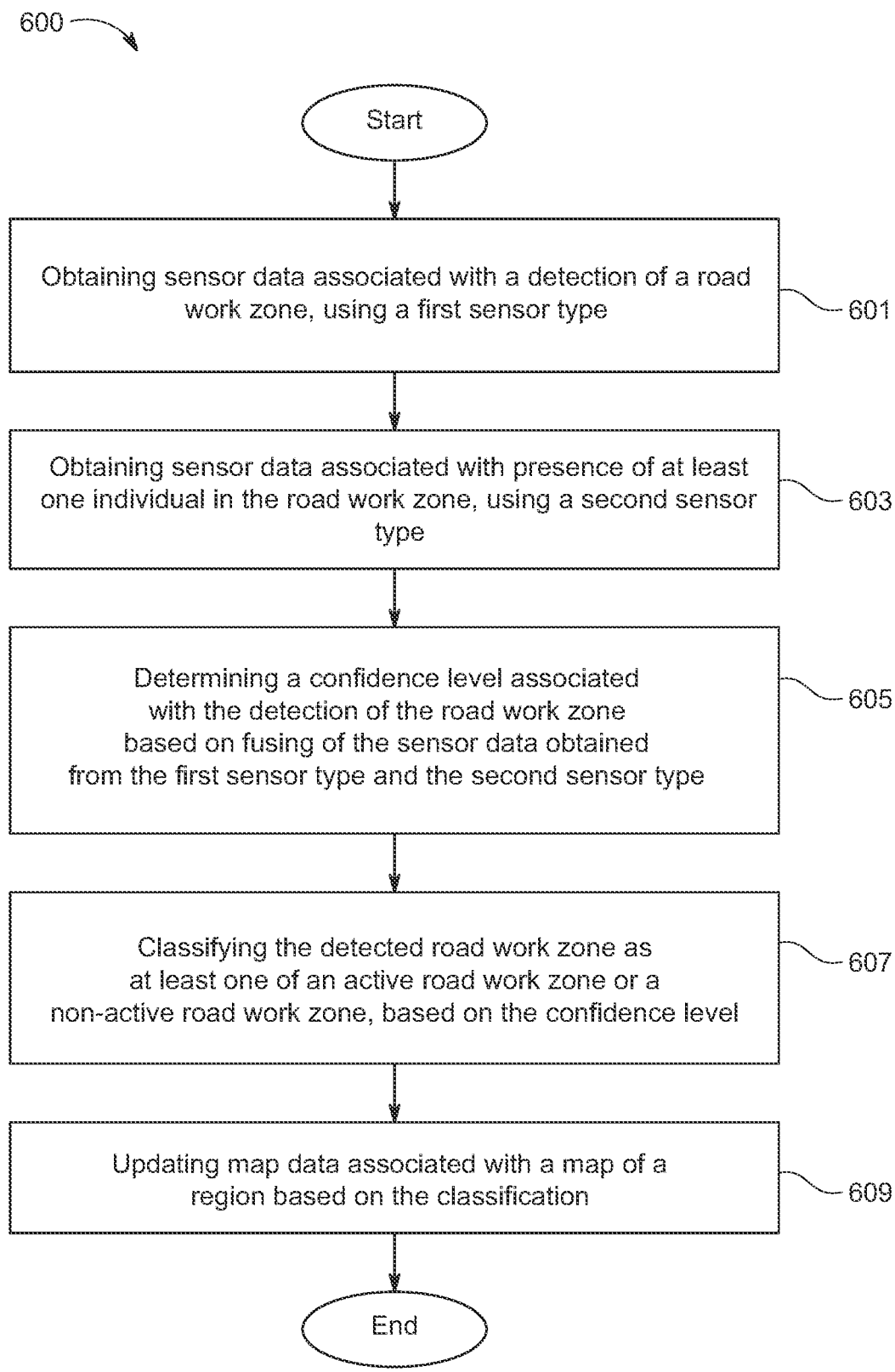

Having thus described example embodiments of the invention in general terms, reference will now be made to the accompanying drawings, which are not necessarily drawn to scale, and wherein:

FIG. 1A illustrates a schematic diagram of a network environment of a system for detecting active road work zone, in accordance with an example embodiment;

FIG. 1B illustrates a block diagram of the system for detecting the active road work zone, in accordance with an example embodiment;

FIG. 1C illustrates an exemplary map data record storing data associated with a first sensor type and a second sensor type obtained by the system shown in FIG. 1A, in accordance with an example embodiment;

FIG. 1D illustrates another exemplary map database record storing data associated with the first sensor type and the second sensor type obtained by the system shown in FIG. 1A, in accordance with one or more example embodiments;

FIG. 1E illustrates an exemplary map database storing data for the first sensor type and the second sensor type obtained by the system shown in FIGS. 1C and 1D, in accordance with one or more example embodiments;

FIG. 2 illustrates a graph depicting a confidence level determined by the system for detecting the active road work zone, in accordance with an example embodiment;

FIG. 3 illustrates a use case of the system for detecting the active road work zone, in accordance with an example embodiment;

FIG. 4 illustrates an exemplary database record storing data associated with vulnerable road users, in accordance with an example embodiment;

FIG. 5 illustrates a tabular representation of pattern data of the active road work zone, in accordance with an example embodiment; and FIG. 6 illustrates a flow diagram of a method for detecting the active road work zone, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road works" may be used to refer to "road under construction" or "construction work on one or more roads".

The term "autonomous vehicle" may refer to any vehicle having autonomous driving capabilities at least in some conditions. The autonomous vehicle may also be known as a driverless car, robot car, self-driving car, or autonomous car. For example, the vehicle may have zero passengers or passengers that do not manually drive the vehicle, but the vehicle drives and maneuvers automatically. There can also be semi-autonomous vehicles.

End of Definitions

Embodiments of the present disclosure may provide a system, a method, and a computer program product for detecting active road work zones (also alternately referred to as "road works"). The road works may be associated with one or more roads, such as a construction site on a road. After completion of road works, construction related signs are moved to the side of a link. Such construction related signs are still observed by sensors of vehicles passing through the road. Thus, such false observations of construction related signs such as, lane detour, construction site ahead, lane closed etc., may imply ongoing road work even after road work has ended. It may further cause unnecessary transition from autonomous mode to manual mode, in autonomous or semi-autonomous vehicles. It may be bothersome and unnecessary for users due to a number of reasons. To that end, it would be advantageous to provide methods and systems that detect only active road works by detecting presence of construction workers and send alerts to the users of the autonomous or semi-autonomous vehicles based on road work observations. The methods and systems disclosed herein provide the users an ability to take navigation decisions based on the alerts received in real time.

In this manner, the methods and systems disclosed herein may provide efficient and user-friendly techniques for detecting active road works. Further, in some embodiments, most of the processing is done by a remote server based or cloud-based server, so the user may be able to leverage fast processing and improved storage benefits provided by the systems and methods disclosed herein. Further, data for detecting active road works using the methods and systems disclosed herein may be gathered through a number of techniques, such as historical data usage, real time data from map service providers, sensor data and the like. Thus, the data may be obtained in real time, providing accurate and reliable road work observations to the users. These and other technical improvements of the invention will become evident from the description provided herein.

The system, the method, and the computer program product facilitating detection of active road work zones are described with reference to FIG. 1A to FIG. 6.

FIG. 1A illustrates a schematic diagram of a network environment 100A of a system 101 for detecting the active road work zones, in accordance with an example embodiment. The system 101 may be communicatively coupled to one or more vehicles 107, an OEM (Original Equipment Manufacturer) cloud 109, a server 113 and a database 115 through a network 111. The system 101 includes a processor 103 and a memory 105. The memory 105 stores instructions which are executed by the processor 103 to cause the system 101 perform a few steps for detecting the active road work zones. The components described in the network environment 100A may be further broken down into more than one component such as one or more sensors or application in the one or more vehicles and/or combined together in any suitable arrangement. Further, it is possible that one or more components may be rearranged, changed, added, and/or removed without deviating from the scope of the present disclosure.

In an example embodiment, the system 101 may be embodied in one or more of several ways as per the required implementation. The system 101 may be configured to operate outside the one or more vehicles 107. However, in some example embodiments, the system 101 may be embodied within the one or more vehicles 107, for example as a part of an in-vehicle navigation system, a navigation app in a mobile device and the like. In each of such embodiments, the system 101 may be communicatively coupled to the components shown in FIG. 1 to conduct the desired operations and wherever required modifications may be possible within the scope of the present disclosure.

The system 101 is implemented in the one or more vehicles 107, where the one or more vehicles 107 correspond to an autonomous vehicle, a semi-autonomous vehicle, or a manually driven vehicle. The one or more vehicles 107 are equipped with a plurality of sensors 107A. The plurality of sensors 107A is installed in the one or more vehicles 107. The plurality of sensors 107A includes a first sensor type and a second sensor type.

The system 101 obtains first sensor data associated with a detection of a road work zone, using the first sensor type. The first sensor type comprises a first camera that may be associated with the one or more vehicles 107. For example, the first camera may be on-board the one or more vehicles 107, in the form of a front-facing camera. In another example, the first camera may be an on-chip camera.

In an embodiment, the first sensor type includes but may not be limited to one or more cameras, radar sensors, and light detection and ranging (LIDAR) sensors. In general, radar sensors are used to detect, track, locate, and identify various types of objects at significant distances. In addition, radar sensors work reliably under low visibility conditions such as cloudy weather, snow, rain, and fog. Generally, LIDAR sensors use eye-safe laser beams to capture 3-dimensional view of a surrounding environment of a vehicle. In addition, LIDAR sensors provide an accurate representation of a surveyed environment. In another embodiment, the first sensor type may also include gyroscope sensors, location sensors, proximity sensors and the like. The first sensor data includes data captured by the first sensor type. In an example, the first sensor data includes data associated with at least one of distance between the one or more vehicles 107 and objects on the one or more roads, geographical location of the one or more roads, images of road objects, 3-dimensional surrounding images of the one or more vehicles 107, construction related signs on the one or more roads, and the like.

Further, the system 101 obtains second sensor data associated with presence of at least one individual in the road work zone, using the second sensor type. The second sensor type comprises a second camera. The second camera is also associated with the one or more vehicles 107 and may be on-board the one or more vehicles 107. In an example, the second camera may be an on-chip camera. For example, the second sensor type corresponds to a camera that is used for active blind spot detection of surroundings of the one or more vehicles 107. In addition, the second camera includes but may not be limited to passive infrared sensors for detection of presence of at least one individual in the road work zone. Generally, the passive infrared sensor is used to detect presence of human beings along with direction of movements. Further, the second sensor data corresponds to data obtained by the second sensor type. The second sensor data is the data associated with the presence of at least one individual in the road work zone. The second sensor data comprises at least vulnerable road user (VRU) data. The VRU data further comprises at least: a number value, a timestamp value, position of the at least one individual. The number values defines the number of individuals present in the road work zone. In addition, the timestamp value defines date and time of detection of at least one individual in the road work zone.

Further, the system 101 determines a confidence level associated with the detection of the road work zone based on fusing of the first sensor data obtained from the first sensor type and the second sensor data obtained from the second sensor type.

The fusing of the first sensor data obtained from the first sensor type and the second sensor data obtained from the second sensor type includes determining a first region associated with the detection of the road work zone using the first sensor data of the first sensor type. Further, the fusing of the first sensor data obtained from the first sensor type and the second the second sensor type includes extracting the second sensor data of the second sensor type for the determined first region and fusing the first sensor data of the first sensor type and the extracted second sensor data of the second sensor type based on a spatio-temporal constraint criterion. In general, the spatio-temporal constraint criterion is dependent on location and time. The spatio-temporal constraint criterion includes determining a first road link, a first travel direction, and a first timestamp associated with the first sensor data of the first sensor type; determining a second road link, a second travel direction, and a second timestamp associated with the sensor data of the second sensor type; and fusing the sensor data of the first sensor type and the extracted second sensor data of the second sensor type when the first road link, the first travel direction, and the first timestamp associated with the first sensor data of the first sensor type overlap respectively with the second road link, the second travel direction, and the second timestamp associated with the second sensor data of the second sensor type. The fused sensor data is processed by the processor 103. In general, a timestamp is a sequence of characters or encoded information identifying when a certain event occurred, usually giving date and time of day, sometimes accurate to a small fraction of a second.

The system 101 is configured to classify the detected road work zone as at least one of the active road work zone or a non-active road work zone, based on the confidence level and update map data associated with a map of a region based on the classification. The detected road work zone is classified as one of the active road work zone when the confidence level is above a predefined threshold for number of observations of the active road work zone, or the non-active road work zone when the confidence level is below the predefined threshold for the number of observations of the active road work zone.

The system 101 is configured to detect presence of the at least one individual on the one or more roads to determine the active road work zones based on the processed first sensor data and the second sensor data. In an embodiment, the at least one individual corresponds to at least one of construction workers, regular pedestrians, and vulnerable road users. In some embodiments, the system 101 performs the detection of presence of the at least one individual on the one or more roads in two steps. A first step of the two steps includes filtering of the at least one individual from a plurality of road objects by applying a machine learning algorithm on the obtained first sensor data and the second sensor data. A second step of the two steps includes distinguishing between the construction workers, the regular pedestrians, and the vulnerable road users to prevent false positive active road work zones by applying a computer vision algorithm on the obtained first sensor data and the second sensor data. For example, the construction workers tend to wear a vest with yellow or orange colors. The computer vision algorithm is used distinguish the construction workers from the regular pedestrians based on the colors of the vest. In general, the computer vision algorithm may be a scale-invariant feature transform (SIFT) algorithm that is used to detect, describe, and match features in images. In addition, the computer vision algorithm is used in applications such as object recognition, robotic mapping and navigation, image stitching, 3D modelling, gesture recognition, and video tracking. The computer vision algorithm is not limited to the above mentioned example. The detection of presence of the at least one individual is performed to determine the confidence level associated with the active road work zones.

The system 101 further calculates a longitudinal distance and a lateral distance between the detected the at least one individual and the one or more vehicles 107 using the second sensor data. The lateral distance corresponds to sideways distance between the at least one individual and the vehicle of the one or more vehicles 107. The longitudinal distance corresponds to vertical length of distance between the at least one individual in the road work zone and the vehicle of the one or more vehicles 107. In some embodiments, the system 101 may update the map data with the road work observations with clear indicators. In an example, red colour in the map data may indicates detection of the active road work zones and black colour in the map data may indicate that the non-active road work zone is detected. The system 101 aggregates a number of observations of the active road work zones to determine the confidence level. The confidence level associated with the active road work zones increases as the number of observations of the active road work zone increases. The confidence level increases when the presence of vulnerable road user (VRU) is determined in the detected road work zone.

The system 101 creates pattern data for long term active road work zones based on the number of observations of the active road work zones. Also, the system 101 send alerts associated with the active road work zones to the one or more vehicles 107 to reduce level of autonomy of the one or more vehicles 107 based on the determined confidence level and the calculated longitudinal and lateral distances. The reducing level of autonomy of the one or more vehicles 107 corresponds to switching of driving mode from autonomous driving mode to manual driving mode. In some embodiments, the system 101 may provide recommendations to users of the one or more vehicles to change route for reaching a destination based on the active road work zones on current route taken by the one or more vehicles. The system 101 may provide an alternate route to the one or more vehicles. The alternate route may be a route without any active road work zones.

The system 101 is coupled to the OEM cloud 109 via the network 111. The communication network 104 includes a satellite network, a telephone network, a data network (local area network, metropolitan network, and wide area network), distributed network, and the like. In one embodiment of the present invention, the network 111 is internet. In another embodiment of the present invention, the network 111 is a wireless mobile network. In yet another embodiment of the present invention, the network 111 is a combination of the wireless and wired network for optimum throughput of data extraction and transmission. The network 111 includes a set of channels. Each channel of the set of channels supports a finite bandwidth. The finite bandwidth of each channel of the set of channels is based on capacity of the network 111. In addition, the network 111 connects the system 101 to the server 113 and the database 115 using a plurality of methods. The plurality of methods used to provide network connectivity to the system 101 may include 2G, 3G, 4G, 5G, and the like.

The network 111 connects the OEM cloud 109 with the system 101. The OEM cloud 109 may be configured to anonymize any data received from the one or more vehicles 107, before using the data for further processing, such as before sending the data to the processor 103 for detection of the active road work zones. In some embodiments, the OEM cloud 109 includes historic data related to road work zones of the one or more roads.

The system 101 is communicatively connected with the server 113 through the network 111. In general, server is a computer program or device that provides functionality for other programs or devices. The server 113 provides various functionalities, such as sharing data or resources among multiple clients, or performing computation for a client. However, those skilled in the art would appreciate that the system 101 may be connected to a greater number of servers. Furthermore, it may be noted that the server 113 includes the database 115.

The server 113 manages each operation and task performed by the system 101. In one embodiment, the server 113 is located remotely. The server 113 is associated with an administrator. In addition, the administrator manages the different components associated with the system 101. The administrator is any person or individual who monitors the working of the system 101 and the server 113 in real-time. The administrator monitors the working of the system 101 and the server 113 through a computing device. The computing device includes laptop, desktop computer, tablet, a personal digital assistant, and the like. In addition, the database 115 stores the first sensor data and the second sensor data. The database 115 organizes the first sensor data and the second sensor data using model such as relational models or hierarchical models. The database 115 also stores data provided by the administrator.

The database 115 may corresponds to a map database that may store node data, road segment data or link data, point of interest (POI) data, road obstacles related data, traffic objects related data, posted signs related data, such as road sign data, related to permissible driving directions, data about valid paths based on legally permissible road geometries or the like. The map database may also include cartographic data and/or routing data. According to some example embodiments, the road segment data records may be links or segments representing roads, streets, or paths, as may be used in determining active road work zones. The node data may be end points corresponding to the respective links or segments of road segment data. For example, the node data may represent data for intersections. The road/link data and the node data may represent a road network, such as used by vehicles, for example, cars, trucks, buses, motorcycles, and/or other entities.

FIG. 1B illustrates a block diagram 100B of the system 101 for detecting the active road work zones, in accordance with an example embodiment. The system 101 may include the at least one processor 103 (hereinafter, also referred to as "processor 103"), the memory 103 and at least one communication interface 117 (hereinafter, also referred to as "communication interface 117"). The processor 103 may include a sensor module 103a, a machine learning module 103b, a distance calculation module 103b, and road work observation module 103d. The processor 103 may retrieve computer program code instructions that may be stored in the memory 105 for execution of the computer program code instructions.

The processor 103 may be embodied in a number of different ways. For example, the processor 103 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 103 may include one or more processing cores configured to perform independently. A multi-core processor may enable multiprocessing within a single physical package. Additionally, or alternatively, the processor 103 may include one or more processors configured in tandem via the bus to enable independent execution of instructions, pipelining and/or multithreading.

In some embodiments, the processor 103 may be configured to provide Internet-of-Things (IOT) related capabilities to users of the system 101. In some embodiments, the users may be or correspond to driver of an autonomous or a semi-autonomous vehicle. The IoT related capabilities may in turn be used to provide smart navigation solutions by providing real time road work observations to the users to take pro-active decision on turn-maneuvers, lane changes and the like, big data analysis, traffic redirection, and sensor-based data collection. The system 101 may be accessed using the communication interface 117. The communication interface 117 may provide an interface for accessing various features and data stored in the system 101.

In an example embodiment, the processor 103 may be in communication with the memory 105 via a bus for passing information among components coupled to the system 101. The memory 105 may be non-transitory and may include, for example, one or more volatile and/or non-volatile memories. In other words, for example, the memory 105 may be an electronic storage device (for example, a computer readable storage medium) comprising gates configured to store data (for example, bits) that may be retrievable by a machine (for example, a computing device like the processor 103). The memory 105 may be configured to store information, data, content, applications, instructions, or the like, for enabling the apparatus to conduct various functions in accordance with an example embodiment of the present invention. For example, the memory 105 may be configured to buffer data for processing by the processor 103.

As exemplarily illustrated in FIG. 1B, the memory 105 may be configured to store instructions for execution by the processor 103. As such, whether configured by hardware or software methods, or by a combination thereof, the processor 103 may represent an entity (for example, physically embodied in circuitry) capable of performing operations according to an embodiment of the present invention while configured accordingly. Thus, for example, when the processor 103 is embodied as an ASIC, FPGA or the like, the processor 103 may be specifically configured hardware for conducting the operations described herein. Alternatively, as another example, when the processor 103 is embodied as an executor of software instructions, the instructions may specifically configure the processor 103 to perform the algorithms and/or operations described herein when the instructions are executed. However, in some cases, the processor 103 may be a processor specific device (for example, a mobile terminal or a fixed computing device) configured to employ an embodiment of the present invention by further configuration of the processor 103 by instructions for performing the algorithms and/or operations described herein. The processor 103 may include, among other things, a clock, an arithmetic logic unit (ALU) and logic gates configured to support operation of the processor 103.

The sensor module 103a includes the first sensor type and the second sensor type. In an example, the sensor module 103a may include acoustic sensors such as a microphone array, position sensors such as a GPS sensor, a gyroscope, RADAR, a LIDAR sensor, a proximity sensor, motion sensors such as accelerometer, a beacon sensor, a thermal sensor, an image sensor such as a camera and the like. The sensor module 201a may be configured to receive the first sensor data and the second sensor data from the one or more vehicles 107. The first sensor data may be associated with a road object. The road object includes various types of objects that are encountered by the one or more vehicles 107 on the one or more roads. For example, the road object may be a road sign, such as a construction related sign, a speed limit sign, a road work zones detection sign, a traffic cone, a guide rail, and the like. In one embodiment, the camera associated with the vehicle captures the road sign in the form of a road work observation. The second sensor data is associated with presence of the at least one individual in the road work zone. The first sensor data and the second sensor data are processed to determine the active road work zones.

To that end, the machine learning module 103b is configured to apply machine learning algorithm to the processed first sensor data and the second sensor data or performing filtering of the at least one individual from a plurality of road objects. In addition, the machine learning module 103b is configured to apply a computer vision algorithm on the first sensor data and the second sensor data to distinguish between the construction workers, the regular pedestrians, and the vulnerable road users to prevent false positive active road work zones.

The distance calculation module 103c, in the processor 103, may be configured to calculate longitudinal distance and lateral distance between the detected at least one individual and the one or more vehicles 107. The lateral distance corresponds to sideways distance between the at least one individual and the one or more vehicles 107. The longitudinal distance corresponds to vertical length of distance between the at least one individual in the road work zone and the one or more vehicles 107. To that end, the road work observation module 103d is configured is to aggregate a number of observations of the active road work zones to determine the confidence level.

Based on the calculated longitudinal and lateral distances and the determined confidence level, the system 101 send alerts associated with the active road work zones to the one or more vehicles 107 to reduce level of autonomy of the one or more vehicles. The system 101 sends alerts to the one or more vehicles 107 when the vehicle 307 is approaching a zone of active road work zones. The road work observations may be updated on the OEM cloud 109 for future use. The road work observations may then be used for further communication in navigation applications involving the system 101, by suitable access mechanisms provided by the communication interface 117 module.

The communication interface 117 may comprise input interface and output interface for supporting communications to and from users of the one or more vehicles 107 or any other component with which the system 101 may communicate. The communication interface 117 may be any means such as a device or circuitry embodied in either hardware or a combination of hardware and software that is configured to receive and/or transmit data to/from a communications device in communication with the users of the one or more vehicles 107. In this regard, the communication interface 117 may include, for example, an antenna (or multiple antennae) and supporting hardware and/or software for enabling communications with a wireless communication network. Additionally, or alternatively, the communication interface 117 may include the circuitry for interacting with the antenna(s) to cause transmission of signals via the antenna(s) or to manage receipt of signals received via the antenna(s). In some environments, the communication interface 117 may alternatively or additionally support wired communication. As such, for example, the communication interface 117 may include a communication modem and/or other hardware and/or software for supporting communication via cable, digital subscriber line (DSL), universal serial bus (USB) or other mechanisms for enabling the system 101 to conduct information exchange functions in many different forms of communication environments. The communication interface 117 enables exchange of information and instructions for detecting the active road work zones.

FIG. 1C shows format of the map data 100C stored in the map database 115 according to one or more example embodiments. FIG. 1C shows a link data record 119 that may be used to store the first sensor data and the second sensor data, explained in FIG. 1A. This link data record 119 has information (such as "attributes", "fields", etc.) associated with it that allows identification of nodes associated with link and/or geographic positions (e.g., the latitude and longitude coordinates and/or altitude or elevation) of the two nodes. In addition, the link data record 119 may have information (e.g., more "attributes", "fields", etc.) associated with it that specify the permitted speed of travel on a portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record that represents another-than-straight road segment may include shape point data. A shape point is a location along a link between its endpoints. To represent the shape of other-than-straight roads, the database 115 and its associated map database developer selects one or more shape points along the other-than-straight road portion. Shape point data included in the link data record 119 indicate the position, (e.g., latitude, longitude, and optionally, altitude or elevation) of the selected shape points along the represented link.

Additionally, in the compiled geographic database, such as a copy of the map database 115 that is compiled and provided to the communication interface 117, there may also be a node data record 121 for each node. The node data record 121 may have associated with it information (such as "attributes", "fields", etc.) that allows identification of the link(s) that connect to the active road work zones and/or its geographic position (e.g., its latitude, longitude, and optionally altitude or elevation).

FIG. 1D shows another format of the map data 100D stored in the map database 115 according to an example embodiment. In the FIG. 1D, the map data 100D is stored by specifying a road segment data record 123. The road segment data record 123 is configured to represent data that represents active road work zones. In FIG. 1D, the map database 115 contains at least one road segment data record 123 (also referred to as "entity" or "entry") for each road segment in a geographic region.

The map database 115 that represents the geographic region also includes a database record 125 (a node data record 125a and a node data record 125b) (or "entity" or "entry") for each node associated with the at least one road segment shown by the road segment data record 123. (The terms "nodes" and "segments" represent only one terminology for describing these physical geographic features and other terminology for describing these features is intended to be encompassed within the scope of these concepts). Each of the node data records 125a and 125b may have associated information (such as "attributes", "fields", etc.) that allows identification of the road segment(s) that connect to the active road work zones and/or its geographic position (e.g., its latitude and longitude coordinates).

FIG. 1D shows some of the components of the road segment data record 123 contained in the map database 115. The road segment data record 123 includes a segment ID 123a by which the data record can be identified in the map database 105a. Each road segment data record 123 has associated with it information (such as "attributes", "fields", etc.) that describes features of the represented road segment. The road segment data record 123 may include data 123b that indicate the restrictions, if any, on the direction of vehicular travel permitted on the represented road segment. The road segment data record 123 includes data 123c that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 123 may also include data 123d indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of other-than-straight road segment is to use shape points. Shape points are points through which a road segment passes between its end points. By providing the latitude and longitude coordinates of one or more shape points, the shape of other-than-straight road segment can be represented. Another way of representing other-than-straight road segment is with mathematical expressions, such as polynomial splines.

The road segment data record 123 also includes road grade data 123e that indicate the grade or slope of the road segment. In one embodiment, the road grade data 123e include road grade change points and a corresponding percentage of grade change. Additionally, the road grade data 123e may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 123e includes the road grade change points and an actual road grade value for the portion of the road segment after the road grade change point until the next road grade change point or end node. In a further embodiment, the road grade data 123e includes elevation data at the road grade change points and nodes.

The road segment data record 123 also includes data 123g providing the geographic coordinates (e.g., the latitude and longitude) of the end points of the represented road segment. In one embodiment, the data 123g are references to the node data records 123 that represent the nodes corresponding to the end points of the represented road segment.

The road segment data record 123 may also include or be associated with other data 123f that refer to various other attributes of the represented road segment. The various attributes associated with a road segment may be included in a single road segment record or may be included in more than one type of record which cross-reference each other. For example, the road segment data record 123 may include data identifying the name or names by which the represented road segment is known, the street address ranges along the represented road segment, and so on.

FIG. 1D also shows some of the components of the node data record 125 contained in the map database 115. Each of the node data records 125 may have associated information (such as "attributes", "fields", etc.) that allows identification of the road segment(s) that connect to it and/or it is geographic position (e.g., its latitude and longitude coordinates). For the embodiment shown in FIG. 1D, the node data records 125a and 125b include the latitude and longitude coordinates 125a1 and 125b1 for their nodes. The node data records 125a and 125b may also include other data 125a2 and 125b2 that refer to various other attributes of the nodes. In some embodiments, the node data records 125a and 125b may be associated with at least one first point and at least one second point, which may be border points of a storage line to be generated.

Thus, the overall data stored in the map database 115 may be organized in the form of different layers for greater detail, clarity, and precision. Specifically, in the case of high definition maps, the map data may be organized, stored, sorted, and accessed in the form of three or more layers. These layers may include road level layer, lane level layer and localization layer. The data stored in the map database 115 in the formats shown in FIGS. 1C and 1D may be combined in a suitable manner to provide these three or more layers of information. In some embodiments, there may be lesser or fewer number of layers of data also possible, without deviating from the scope of the present disclosure.

FIG. 1E illustrates a block diagram 100E of the map database 115 storing map data or geographic data 131 in the form of road segments/links, nodes, and one or more associated attributes as discussed above. Furthermore, attributes may refer to features or data layers associated with the link-node database, such as an HD lane data layer.

In addition, the geographic data 131 may also include other kinds of data 127. The other kinds of data 127 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The map database 115 also includes indexes 129. The indexes 129 may include various types of indexes that relate the different types of data to each other or that relate to other aspects of the data contained in the database 115.

The data stored in the map database 115 in the various formats discussed above may help in provide precise data for high definition mapping applications, autonomous vehicle navigation and guidance, cruise control using ADAS, direction control using accurate vehicle maneuvering and other such services. In some embodiments, the system 101 accesses the map database 115 storing data in the form of various layers and formats depicted in FIG. 1C-FIG. 1E.

FIG. 2 illustrates a graph 200 depicting a confidence level 203 determined by the system 101 for detecting the active road work zones, in accordance with an example embodiment. The graph is plotted between x-axis and y-axis. The y-axis is the confidence level 203, and the x-axis is time 201. The graph 200 represents a curve 207. The confidence level 203 is increased when a vehicle equipped with the first sensor type ad the second sensor type reports vulnerable road users in an area on a road that is detected with the active road work zones. For example, at time T2, T3 and T4, it is observed that the confidence level 203 increases immediately due to detection of construction workers and vulnerable road user observation on the road. At time T5, the confidence level drops below a predefined threshold 205. At the predefined threshold, the vehicle stops reporting that the road work zone is active, that indicates there are no humans in the road work zone.

Also, the confidence level drops if no vehicles are reporting vulnerable road users in the road work zone. However, as soon as a first vehicle reports vulnerable road user (e.g. at time T2) the confidence level spikes.

FIG. 3 illustrates a use case 300 of the system 101 for detecting the active road work zones, in accordance with an example embodiment. The use case 300 includes a road user 301 and an autonomous vehicle 303. The autonomous vehicle 303 is equipped with a plurality of sensors. The plurality of sensors includes but may not be limited to a camera. The plurality of sensors corresponds to the plurality of sensors 107A including the first sensor type and the second sensor type as explained in FIG. 1A. The autonomous vehicle 303 equipped with the plurality of sensors is configured to collect a set of information associated with the vulnerable road user 303 in real time as the autonomous vehicles drives on a road 305. The set of information includes but may not be limited to number of detected road user 301, a distance x, a distance y, and a timestamp. The distance x corresponds to longitudinal distance from the autonomous vehicle 303 to the detected road user 301. The distance y corresponds to lateral distance between the autonomous vehicle 303 and the detected road user 301. In addition, the timestamp corresponds to a point in time when the road user 303 is detected. The timestamp is generated in a suitable context in the autonomous vehicle 303.

The system 101 is configured to detect presence of the road user 301 (at least one individual) on the road 305 to determine the active road work zones based on the collected set of information. In an embodiment, the road user 301 corresponds to at least one of construction workers, regular pedestrians, and vulnerable road users. The detection of presence of the road user 301 is performed to determine the confidence level associated with the active road work zones. The determination of the confidence level is explained above in FIG. 2. The confidence level associated with the active road work zones increases as the number of observations of the active road work zone increases. The confidence level increases when the presence of the road user 301 is determined in the detected road work zone on the road 305.

Based on the detection the confidence level, and detection of the road user 301, the system 101 sends alerts to the autonomous vehicle 303 when the autonomous vehicle 303 is approaching the road user 301. The system 101 sends alerts associated with the active road work zones to the autonomous vehicle 303 to reduce level of autonomy of the autonomous vehicle 303. The reducing level of autonomy of the autonomous vehicle 303 corresponds to switching of driving mode from autonomous driving mode to manual driving mode. In some embodiments, the system 101 is configured to provide recommendations to users of the autonomous vehicle 303 to change route for reaching a destination based on the active road work zones on current route taken by the one or more vehicles. The system 101 may provide an alternate route to the autonomous vehicle 303. The alternate route may be a route without any active road work zones.

FIG. 4 illustrates an exemplary database record 400 storing the set of information associated with the at least one individual, in accordance with an example embodiment. In an example, the at least one individual corresponds to vulnerable road users (VRU). The set of information corresponds to the VRU data. In an example, the VRU data corresponds to VRU messages 401. The VRU messages 401 are sent from an OEM vehicle to the OEM cloud 109 and then to the system 101. The VRU messages 401 are generated in an in-vehicle data collection component based on trigger conditions. The VRU messages 401 are generated as soon as the at least one individual is detected by the vehicle. The VRU messages 401 are stored in the suitable context. The VRU messages 401 include but may not be limited to timestamp, longitudinal distances, lateral distances, and the number of observations of the VRU. The VRU messages 401 are aligned using spatio-temporal constraints in the system 101. The system 101 further utilizes the VRU messages 401 to detect the active road work zones.

FIG. 5 illustrates a tabular representation of pattern data 500 of the active road work zones, in accordance with an example embodiment. The system 101 is configured to create the pattern data 500 for long term active road work zones based on the number of observations of the active road work zones. The pattern data 500 includes road work ids 501, time epoch 503 for the active road work zones, and status of road work for each day of the week 505. The pattern data 500 is utilized by the one or more vehicles to determine when to expect that a given road work is active in the absence of real-time data. The pattern data 500 is utilized in road work prediction models. In an embodiment, the pattern data 500 includes a road work zones id 501 such as RW123. In addition, the status of road work zones for each day of the week 505 is represented along with the time epochs 503. For example, for the time epoch 9 to 12 on Monday, Tuesday and Wednesday, the status is shown as active, whereas on Sunday the status is shown as "not active". Similarly, for various time epochs, the status may be represented for each day. In an example, the pattern data 500 is utilized to predict timings of the active road work zones corresponding to each day for upcoming days.

FIG. 6 illustrates a flow diagram 600 of a method for detecting the active road work zones, in accordance with an example embodiment. It will be understood that each block of the flow diagram 600 of the method may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 105 of the system 101, employing an embodiment of the present invention and executed by a processor 103. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 600 illustrated by the flowchart diagram of FIG. 6 is detecting the active road work zones. Fewer, more, or different steps may be provided.

At step 601, the method comprises obtaining the first sensor data associated with a detection of a road work zone, using a first sensor type from one or more vehicles 107. At step 603, the method 600 comprises obtaining the second sensor data associated with presence of at least one individual in the road work zone, using a second sensor type. The one or more vehicles 107 are equipped with a plurality of sensors 107A. The first sensor data and the second sensor data is obtained from the plurality of sensors 107A installed in the one or more vehicles 107. The plurality of sensors 107A includes the first sensor type and the second sensor type. The first sensor type corresponds to front facing camera of the one or more vehicles 107. The first sensor type comprises a first camera (As explained above in FIG. 1A). In an embodiment, the first sensor type includes but may not be limited to one or more cameras, radar sensors, and light detection and ranging (LIDAR) sensors. In general, radar sensors are used to detect, track, locate, and identify various types of objects at significant distances. In addition, radar sensors work reliably under low visibility conditions such as cloudy weather, snow, rain, and fog. Generally, LIDAR sensors use eye-safe laser beams to capture 3-dimensional view of a surrounding environment of a vehicle. In addition, LIDAR sensors provide an accurate representation of a surveyed environment. In another embodiment, the first sensor type may also include gyroscope sensors, location sensors, proximity sensors and the like. The first sensor data includes data captured by the first sensor type. In an example, the first sensor data includes data associated with at least one of distance between the one or more vehicles 107 and objects on the one or more roads, geographical location of the one or more roads, images of road objects, 3 dimensional surrounding images of the one or more vehicles 107, construction related signs on the one or more roads, and the like.

The second sensor type comprises a second camera. For example, the second sensor type corresponds to a second type of camera or second type of sensor, different from the first sensor type. Further, the second sensor data corresponds to data obtained by the second sensor type. The second sensor data is the data associated with the presence of at least one individual in the road work zone. The second sensor data comprises at least vulnerable road user (VRU) data. The VRU data further comprises at least: a number value, a timestamp value, position of the at least one individual. The number values defines the number of individuals present in the road work zone. In addition, the timestamp value defines date and time of detection of at least one individual in the road work zone.

At step 605, the method comprises determining a confidence level associated with the detection of the road work zone based on fusing of the first sensor data and the second sensor data obtained from the first sensor type and the second sensor type. The first sensor type comprises a first camera and the second sensor type comprises a second camera. The fusing of the first sensor data obtained from the first sensor type and the second sensor data obtained from the second sensor type includes determining a first region associated with the detection of the road work zone using the first sensor data of the first sensor type. Further, the fusing of the first sensor data obtained from the first sensor type and the second sensor data obtained from the second sensor type includes extracting the second sensor data of the second sensor type for the determined first region and fusing the first sensor data of the first sensor type and the extracted second sensor data of the second sensor type based on a spatio-temporal constraint criterion. The spatio-temporal constraint criterion includes determining a first road link, a first travel direction, and a first timestamp associated with the sensor data of the first sensor type; determining a second road link, a second travel direction, and a second timestamp associated with the second sensor data of the second sensor type; and fusing the first sensor data of the first sensor type and the extracted second sensor data of the second sensor when the first road link, the first travel direction, and the first timestamp associated with the first sensor data of the first sensor type overlap respectively with the second road link, the second travel direction, and the second timestamp associated with the second sensor data of the second sensor type.

At step 607, the method comprises classifying the detected road work zone as at least one of the active road work zone or a non-active road work zone, based on the confidence level. At step 609, the method comprises updating map data associated with a map of a region based on the classification. The detected road work zone is classified as one of the active road work zone when the confidence level is above a predefined threshold for number of observations of the active road work zone, or the non-active road work zone when the confidence level is below the predefined threshold for the number of observations of the active road work zone.

The method 600 described herein, along with all previous embodiments disclosed herein provide enhanced and accurate detection of active road work zones, through the use of two different types of sensors for active road works detection. Additionally, the detection of individuals or VRUs in road work zones provides increased accuracy of prediction that a particular detected road work zone is active. This may help in increasing the overall accuracy of the map database described in previous embodiments, thereby leading to more reliable and safe navigation services being provisioned through such a map database.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for detecting active road work zone, the system comprising:
   a memory configured to store computer-executable instructions; and
   at least one processor configured to execute the computer-executable instructions to:
      obtain first sensor data associated with a detection of a road work zone, using a first sensor type, the first sensor data comprising first real-time sensor data;
      obtain second sensor data associated with a presence of at least one individual in the road work zone, using a second sensor type, the first sensor data comprising second real-time sensor data;
      determine a confidence level associated with the detection of the road work zone based on fusing of the first sensor data obtained from the first sensor type and the second sensor data obtained from the second sensor type;
      classify the detected road work zone as at least one of the active road work zone or a non-active road work zone, based on the confidence level, wherein the detected road work zone is classified as the active road work zone based on the first sensor data indicating the detection of the road work zone and the second sensor data indicating the presence of the at least one individual in the road work zone, and wherein the detected road work zone is classified as a non-active road work zone based on the first sensor data indicating the detection of the road work zone and the second sensor data not indicating the presence of the at least one individual; and
      update map data associated with a map of a region in real-time based on the classification.

2. The system of claim 1, wherein the detected road work zone is classified as at least one of:

the active road work zone when the confidence level is above a predefined threshold; or the non-active road work zone when the confidence level is below the predefined threshold.

3. The system of claim 1, wherein the first sensor data and the second sensor data are obtained from a plurality of sensors comprised of the first sensor type and the second sensor type associated with one or more vehicles, wherein the first sensor type comprises a first camera and the second sensor type comprises a second camera.

4. The system of claim 3, wherein the first sensor data comprises data associated with at least one of distance between the one or more vehicles and objects on one or more roads, geographical location of the one or more roads, images of road objects, 3-dimensional surrounding images of the one or more vehicles, and construction related signs on the one or more roads.

5. The system of claim 1, wherein fusion of the first sensor data obtained from the first sensor type and the second sensor data obtained from the second sensor type comprises causing the at least one processor to execute computer-executable instructions to:

determine a first region associated with the detection of the road work zone using the first sensor data of the first sensor type;

extract the second sensor data of the second sensor type for the determined first region; and fuse the first sensor data of the first sensor type and the extracted second sensor data of the second sensor type based on a spatio-temporal constraint criterion.

6. The system of claim 5, wherein the spatio-temporal constraint criterion comprises causing the at least one processor to execute computer-executable instructions to:

determine a first road link, a first travel direction, and a first timestamp associated with the first sensor data of the first sensor type;

determine a second road link, a second travel direction, and a second timestamp associated with the second sensor data of the second sensor type; and fuse the first sensor data of the first sensor type and the extracted second sensor data of the second sensor type when the first road link, the first travel direction, and the first timestamp associated with the first sensor data of the first sensor type overlap respectively with the second road link, the second travel direction, and the second timestamp associated with the second sensor data of the second sensor type.

7. The system of claim 1, wherein the second sensor data associated with at least the presence of at least one individual in the road work zone using the second sensor type comprises at least:

vulnerable road user (VRU) data associated with the second sensor type, wherein the VRU data further comprises at least: a number value, a timestamp value, and position of the at least one individual.

8. The system of claim 7, wherein the confidence level is incremented by a predetermined value when presence of the VRU is determined in the detected road work zone.

9. The system of claim 1, wherein the at least one processor is configured to calculate a longitudinal distance and a lateral distance between the at least one individual and each of the one or more vehicles.

10. The system of claim 1, wherein the at least one processor is further configured to:

apply a computer vision algorithm on the obtained first sensor data and the second sensor data associated with the detected road work zone.

11. The system of claim 10, wherein the at least one processor is configured to send alerts associated with the active road work zone, based on the determined confidence level.

12. The system of claim 1, wherein the at least one processor is configured to aggregate a number of observations of the active road work zone to determine the confidence level.

13. The system of claim 12, wherein the confidence level associated with the active road work zone increases as the number of observations of the active road work zone increases.

14. The system of claim 12, wherein the at least one processor is configured to create pattern data for active road work zones based on the number of observations of the active road work zone.

15. A method for detecting active road work zones, the method comprising:

obtaining first sensor data associated with a detection of a road work zone, using a first sensor type, the first sensor data comprising first real-time sensor data;

obtaining second sensor data associated with presence of at least one individual in the road work zone, using a second sensor type, the first sensor data comprising second real-time sensor data;

determining a confidence level associated with the detection of the road work zone based on fusing of the first sensor data obtained from the first sensor type and the second sensor data obtained from the second sensor type;

classifying the detected road work zone as at least one of the active road work zone or a non-active road work zone, based on the determined confidence level, wherein the detected road work zone is classified as the active road work zone based on the first sensor data indicating the detection of the road work zone and the second sensor data indicating the presence of the at least one individual in the road work zone, and wherein the detected road work zone is classified as a non-active road work zone based on the first sensor data indicating the detection of the road work zone and the second sensor data not indicating the presence of the at least one individual; and updating map data associated with a map of a region in real-time based on the classification.

16. The method of claim 15, wherein classifying the detected road work zone based on the determined confidence level comprises at least one of:

the active road work zone when the confidence level is above a predefined threshold for a number of observations of the active road work zone; or the non-active road work zone when the confidence level is below the threshold for the number of observations of the active road work zone.

17. The method of claim 15, further comprising:

creating pattern data for active road work zones based on the number of observations of the active road work zone.

18. The method of claim 15, wherein fusing the first sensor data obtained from the first sensor type and the second sensor data obtained from the second sensor type comprises:

determining a first region associated with the detection of the road work zone using the first sensor data of the first sensor type;

extracting the second sensor data of the second sensor type for the determined first region; and fusing the first sensor data of the first sensor type and the extracted second sensor data of the second sensor type based on a spatio-temporal constraint criterion.

19. The method of claim 18, wherein the spatio-temporal constraint criterion comprises:
   determining a first road link, a first travel direction, and a first timestamp associated with the first sensor data of the first sensor type;
   determining a second road link, a second travel direction, and a second timestamp associated with the second sensor data of the second sensor type; and
   fusing the first sensor data of the first sensor type and the extracted second sensor data of the second sensor when the first road link, the first travel direction, and the first timestamp associated with the first sensor data of the first sensor type overlap respectively with the second road link, the second travel direction, and the second timestamp associated with the second sensor data of the second sensor type.

20. A computer program product comprising a non-transitory computer readable medium having stored thereon computer executable instructions which when executed by at least one processor, cause the processor to carry out operations for detecting active road work zones, the operations comprising:
   obtaining first sensor data associated with a detection of a road work zone, using a first sensor type, the first sensor data comprising first real-time sensor data;
   obtaining second sensor data associated with presence of at least one individual in the road work zone, using a second sensor type, the first sensor data comprising second real-time sensor data;
   determining a confidence level associated with the detection of the road work zone based on fusing of the first sensor data and the second sensor data;
   classifying the detected road work zone as at least one of the active road work zone or a non-active road work zone, based on the confidence level, wherein the detected road work zone is classified as the active road work zone based on the first sensor data indicating the detection of the road work zone and the second sensor data indicating the presence of the at least one individual in the road work zone, and wherein the detected road work zone is classified as a non-active road work zone based on the first sensor data indicating the detection of the road work zone and the second sensor data not indicating the presence of the at least one individual; and
   updating map data associated with a map of a region in real-time based on the classification.

* * * * *